US012779303B2

(12) United States Patent
Evans

(10) Patent No.: US 12,779,303 B2
(45) Date of Patent: Nov. 3, 2026

(54) HEATED CORNHOLE BOARD

(71) Applicant: Brendon Buxton Evans, Goleta, CA (US)

(72) Inventor: Brendon Buxton Evans, Goleta, CA (US)

( * ) Notice: Subject to any disclaimer, the term of this patent is extended or adjusted under 35 U.S.C. 154(b) by 278 days.

(21) Appl. No.: 18/633,769

(22) Filed: Apr. 12, 2024

(65) Prior Publication Data

US 2024/0350882 A1 Oct. 24, 2024

Related U.S. Application Data

(60) Provisional application No. 63/460,644, filed on Apr. 20, 2023.

(51) Int. Cl.
*A63B 67/06* (2006.01)
*H05B 3/22* (2006.01)

(52) U.S. Cl.
CPC ............... *A63B 67/06* (2013.01); *H05B 3/22* (2013.01); *A63B 2210/50* (2013.01); *A63B 2225/64* (2013.01)

(58) Field of Classification Search
CPC ........ A63B 67/06; A63B 2225/64; H05B 3/22
See application file for complete search history.

(56) References Cited

U.S. PATENT DOCUMENTS 6,092,587 A * 7/2000 Ingram .................. F24D 13/02
165/56

OTHER PUBLICATIONS

"Think you can play cornhole with the pros?", by KC Joyner. Jul. 4, 2018. pp. 1-5. (https://www.espn.com/espn/story/_/id/23915041/think-play-cornhole-pros) (Year: 2018).*

"Hot Wire Table Heating: Feel the Difference", Feb. 16, 2023. pp. 1-17. (https://web.archive.org/web/20230216140952/https://www.hotwiresnookerheaters.com/) (Year: 2023).*

"How To Install Infrared Heating Panels", by Infrared Heaters Direct Advice Centre. Mar. 17, 2022. p. 1. (https://www.infraredheatersdirect.co.uk/news/how-to-install-infrared-heating-panels/) (Year: 2022).*

"Humidity and Cornhole: Strategies for Conquering Humid Boards", by Buffalo Boards. May 2, 2023. pp. 1-7. (https://buffaloboards.com/blogs/buffalos-back-door/humidity-and-cornhole-strategies-for-conquering-humid-boards?srsltid=AfmBOopyse_1mOdlpNXJ9fvhfs_70Z7IG-LMNYVE94XhY_LeSqXqlfn0) (Year: 2023).*

(Continued)

*Primary Examiner* — Will A Brandenburg

(74) *Attorney, Agent, or Firm* — Withrow & Terranova, PLLC

(57) ABSTRACT

A heated cornhole board is disclosed. In one aspect, a heating element may be placed on an underside of a playing surface. When power is supplied to the heating element, the heating element warms the material of the playing surface. This warming may raise the temperature of the playing surface above a dew point, precluding condensation from forming and/or accelerating evaporation of condensation forming on the playing surface. By preventing condensation from forming on the playing surface, gameplay does not change, thereby improving the game experience.

11 Claims, 4 Drawing Sheets

(56) References Cited

OTHER PUBLICATIONS

"Shuffleboard Table Maintenance: How To Keep Your Table In Top Condition", by Gaming Blaze. Apr. 1, 2023. pp. 1-18. (https://www.gamingblaze.com/blogs/news/shuffleboard-table-maintenance-how-to-keep-your-table-in-top-condition?srsltid=AfmBOopU7yyO0qBwMQhW6ae4AQ-sB4Tc3Yqj8MA6bcukL2MdXHxkGBJO) (Year: 2023).*
"More on How to Care for Your Cornhole Boards", by SkipsGarage. Feb. 23, 2022. (https://www.skipsgarage.com/blogs/ cornhole/more-on-how-to-care-for-your-cornhole-boards). pp. 1-5. (Year: 2022).*

* cited by examiner

HEATED CORNHOLE BOARD

BACKGROUND

I. Field of the Disclosure

The technology of the disclosure relates generally to cornhole boards and, more particularly, to boards that are treated to avoid moisture accumulation.

II. Background

Cornhole is a popular backyard game whose popularity extends from North Carolina to California. While numerous rule variations exist, at its core, cornhole involves tossing bean bags through a hole in a slanted board. In almost all cases, the slanted board is formed from wood and may be painted with indicia reflecting some motif of interest to the owners/players.

In many cases, the boards are used outside and/or in the evening hours when there may be a drop in temperature and/or a change in humidity. In the right circumstances, the board may be a locus for condensation. This condensation will change the character of the board, which in turn changes how the bean bags behave when they strike the board. Such environmental changes in gameplay are undesirable and offer an opportunity for innovation.

SUMMARY

Aspects disclosed in the detailed description include a heated corn hold board. In particular, a heating element may be placed on an underside of a playing surface. When power is supplied to the heating element, the heating element warms the material of the playing surface. This warming may raise the temperature of the playing surface above a dew point, precluding condensation from forming and/or accelerating evaporation of condensation forming on the playing surface. By preventing condensation from forming on the playing surface, gameplay does not change, thereby improving the game experience.

In this regard, in one aspect, a cornhole board is disclosed. The cornhole boards include a playing board comprising an upper surface and a lower surface opposite the upper surface, wherein the playing board delimits an aperture therethrough and a resistive heating element coupled to the lower surface of the playing board.

DETAILED DESCRIPTION

Figure 1:
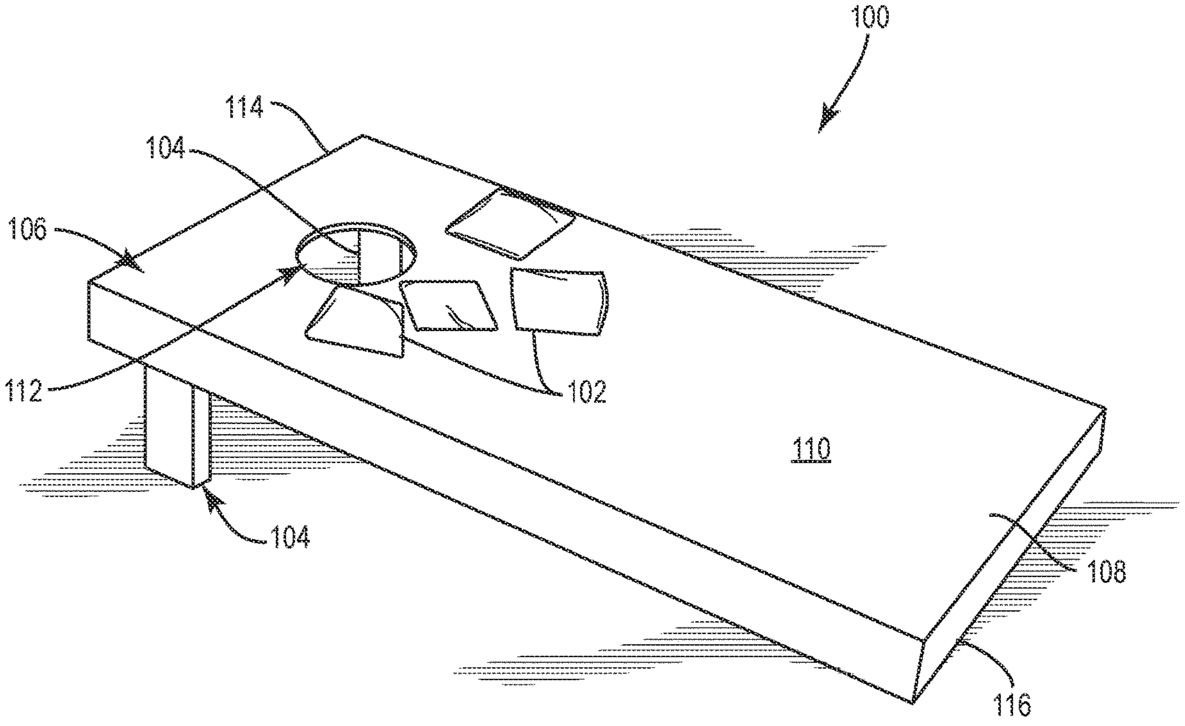
FIG. 1 is a side perspective view of a cornhole board with bags.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term “and/or” includes any and all combinations of one or more of the associated listed items.

It will be understood that when an element such as a layer, region, or substrate is referred to as being “on” or extending “onto” another element, it can be directly on or extend directly onto the other element, or intervening elements may also be present. In contrast, when an element is referred to as being “directly on” or extending “directly onto” another element, no intervening elements are present. Likewise, it will be understood that when an element such as a layer, region, or substrate is referred to as being “over” or extending “over” another element, it can be directly over or extend directly over the other element or intervening elements may also be present. In contrast, when an element is referred to as being “directly over” or extending “directly over” another element, no intervening elements are present. It will also be understood that when an element is referred to as being “connected” or “coupled” to another element, it can be directly connected or coupled to the other element, or intervening elements may be present. In contrast, when an element is referred to as being “directly connected” or “directly coupled” to another element, no intervening elements are present.

Relative terms such as “below” or “above” or “upper” or “lower” or “horizontal” or “vertical” may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms “a,” “an,” and “the” are intended to include the plural forms as well unless the context clearly indicates otherwise. It will be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a heated corn hold board. In particular, a heating element may be placed on an underside of a playing surface. When power is supplied to the heating element, the heating element warms the material of the playing surface. This warming may raise the temperature of the playing surface above a dew point, precluding condensation from forming and/or accelerating evaporation of condensation forming on the playing surface. By preventing condensation from forming on the playing surface, gameplay does not change, thereby improving the game experience.

Before addressing aspects of the present disclosure, a brief overview of a traditional cornhole board is provided with reference to FIG. 1. It should be appreciated that modern cornhole can trace its origins to U.S. Pat. No. 285,396 for Parlor Quoits, although several changes have occurred over the years, and there are many variations. A discussion of exemplary aspects of the present disclosure begins below with reference to FIG. 2. While a modern cornhole board is specifically contemplated, aspects of the present disclosure are readily adapted to many variations, as will be readily apparent to someone skilled in the art.

In this regard, FIG. 1 is a side perspective view of a cornhole board 100 with bags 102. Typically, a board 100 includes a pair of folding legs 104 (only one shown) that elevates one end 106 of the board while leaving an opposite end 108 at a lower elevation. An upper surface 110 is generally planar and delimits an aperture 112 that is circular and sized to allow a bean bag to fit therethrough. The upper surface 110 measures (0.61 by 1.22 m), with a 6-inch (150 mm) diameter aperture 112. The aperture's center is positioned 9 inches (230 mm) down from the center of the top edge 114 of the board 100. Each board 100 is angled with the top edge 114 of the playing surface 12 inches (300 mm) above the ground and the bottom edge 116 3-4 inches (76-102 mm) above the ground. A standard court places two boards 33 feet (10 m) or 27 feet (8.2 m) apart, measuring from the bottom edge of the boards. Different (usually shorter) distances may be used if space is limited or younger players participate. Some smaller versions of the game, with scaled-down boards, bags, and holes, are available specifically for children.

The board 100 is typically made from plywood or pressure-treated lumber and covered with paint. When subjected to dropping temperatures in humid environments, condensation may form on the board 100. This condensation may change the gameplay or may just aggravate players who do not want to play with wet bean bags.

Figure 3:
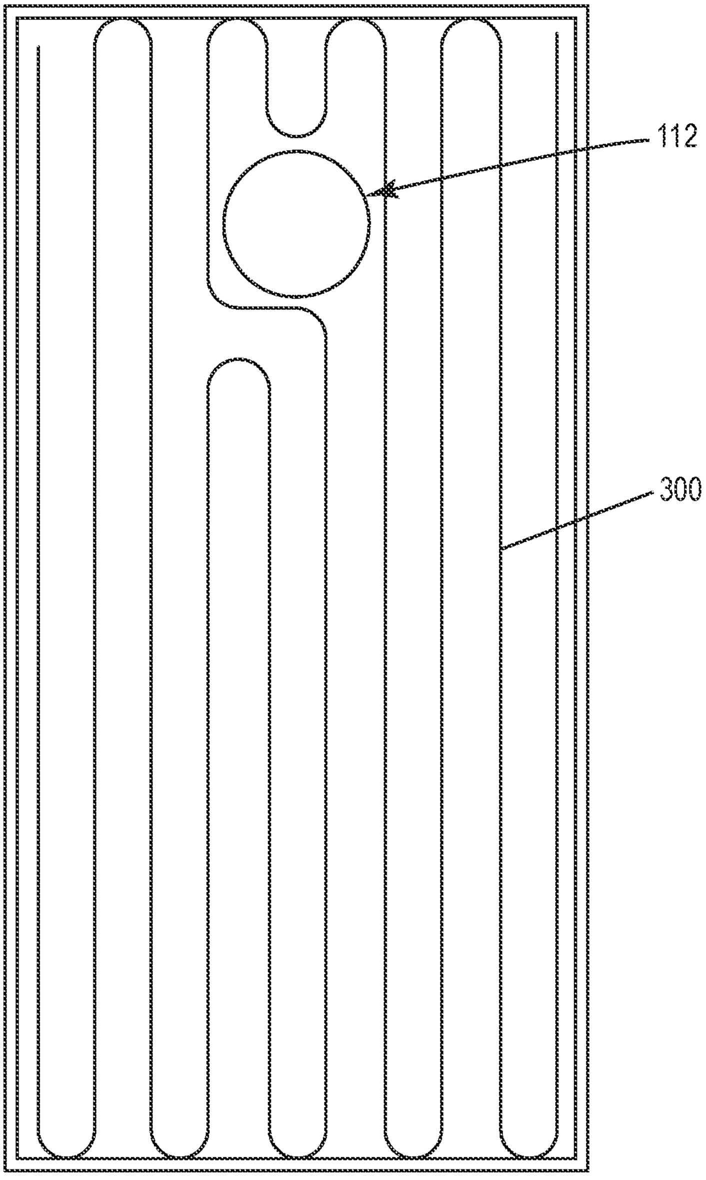
FIG. 3 is a bottom up plan view of a cornhole board with a wire routed on a lower surface of the playing board in a curved vertical pattern, again with specific accommodations for the aperture.
Figure 4:
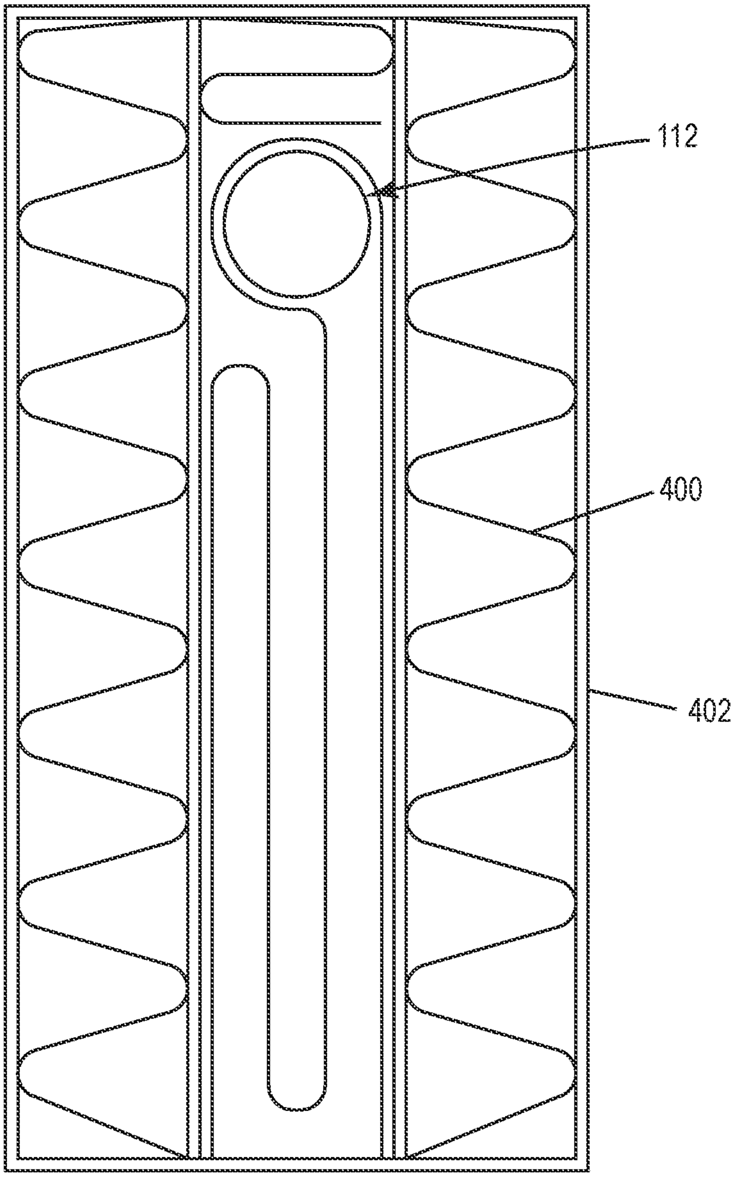
FIG. 4 is a bottom up plan view of a cornhole board with a wire routed on a lower surface of the playing board in a series of triangle-like shapes along a longer edge of the board with additional routing within the interior and around the aperture.

Exemplary aspects of the present disclosure add a heating element to the cornhole board so that the surface of the board does not reach a dew point and thus does not serve as a locus for condensation. In a first aspect, the resistive heating element is a resistive heating wire attached to the underside of the cornhole board. The heating wire can be taped to the underside, embedded in a routed out channel in the board itself, or sandwiched between layers of wood that form the playing surface. To ensure proper board heating, the length of the wire and the routing are calibrated to heat the board evenly without requiring crossing the wire. A radiant barrier may be placed on top of the installed wire to increase efficiency. A variety of acceptable wire paths are illustrated in FIGS. 2-4.

Figure 2:
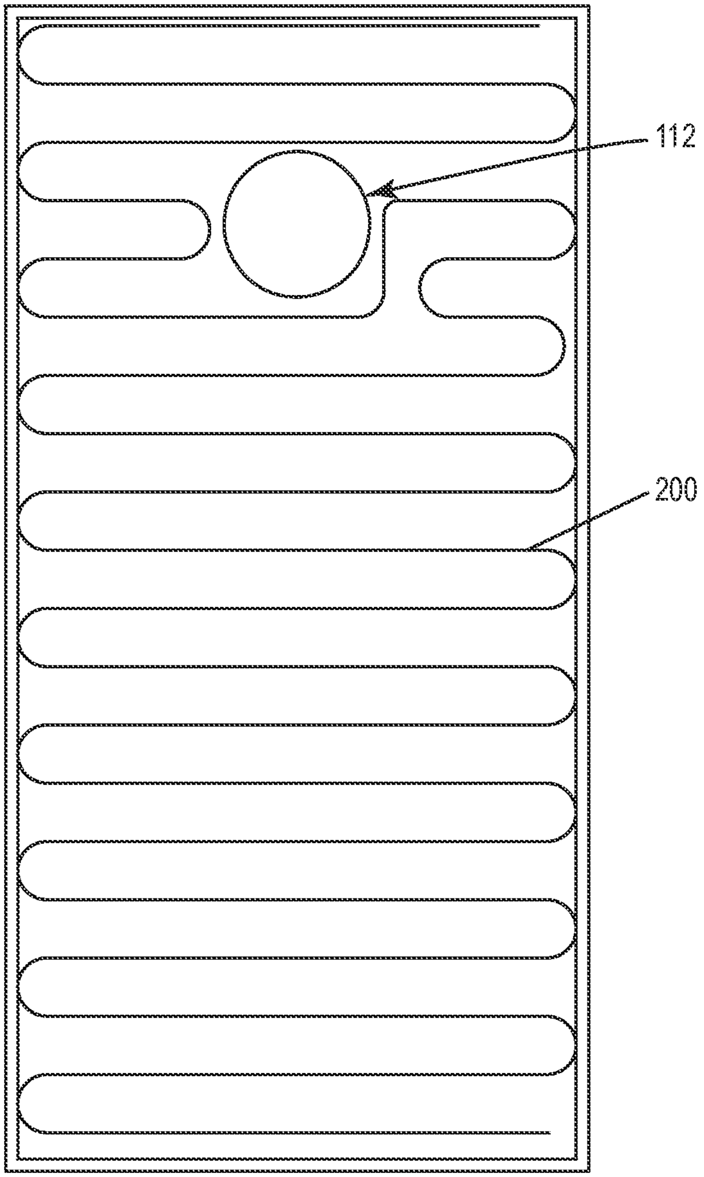
FIG. 2 is a bottom up plan view of a cornhole board with a wire routed in a sinuous horizontal pattern on a lower surface of the playing board with some specific accommodations for the aperture.

In FIG. 2, a wire 200 is routed in a sinuous horizontal pattern on a lower surface of the playing board with some specific accommodations for the aperture 112. In FIG. 3, a wire 300 is routed on a lower surface of the playing board in a curved vertical pattern, again with specific accommodations for the aperture 112. In FIG. 4, a wire 400 is routed on a lower surface of the playing board in a series of triangle-like shapes along a longer edge 402 of the board with additional routing within the interior and around the aperture 112.

While not shown, a radiant barrier may be positioned over the resistive heating wire opposite the lower surface so that heat reflects back toward the playing board.

In exemplary aspects, the heating wire may include a plug (e.g., for 110 V outlet or extension cord) or be battery operated. The heating wire may include a switch that is configured to turn on and off the heating wire. Further, a heating sensor and/or thermostat may be included to prevent overheating. Still another option would be to use a form of light emitting diode (LED) radiant lighting to heat the board. Still another option would be to attach removably the heating element using a fastener such as a snap, button, or hook and loop fastener. Still another heating element would be a ceramic heater similar to those used for reptile housing.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A cornhole board, comprising:

a wooden playing board comprising an upper surface and a lower surface opposite the upper surface, wherein the playing board delimits an aperture therethrough;

a pair of legs movable between a foldable position and a deployed position, the pair of legs attached to the wooden playing board; and a resistive heating element coupled to the lower surface of the playing board, wherein when the resistive heating element is activated, heat radiates through the wooden playing board to the upper surface.

2. The cornhole board of claim 1, wherein the resistive heating element comprises a horizontal sinuous pattern.

3. The cornhole board of claim 1, wherein the resistive heating element comprises a vertical sinuous pattern.

4. The cornhole board of claim 1, further comprising a power cord and plug configured to be inserted into a wall outlet or extension cord outlet.

5. The cornhole board of claim 1, further comprising a battery coupled to the resistive heating element.

6. The cornhole board of claim 4 or 5 further comprising a switch configured to turn on and off the resistive heating element.

7. The cornhole board of claim 1, further comprising a radiant barrier positioned over the resistive heating element opposite the lower surface.

8. The cornhole board of claim 1, further comprising a switch to couple the heating element to a power source.

9. The cornhole board of claim 8, wherein the switch couples the heating element to a battery.

10. The cornhole board of claim 8, wherein the switch couples the heating element to an outlet.

11. A cornhole board, comprising:

a wooden playing board comprising an upper surface and a lower surface opposite the upper surface, wherein the playing board delimits an aperture therethrough;

a pair of legs movable between a foldable position and a deployed position, the pair of legs attached to the wooden playing board; and an electrically resistive heating element coupled to the lower surface of the playing board, the resistive heating element comprising a continuous electrical conductor arranged in a non-crossing path on the lower surface, the non-crossing path comprising conductor segments adjacent each side of the aperture and connecting around the aperture without crossing thereover, wherein when the resistive heating element is activated, heat radiates through the wooden playing board to the upper surface.

* * * * *